United States Patent
Stevens

(10) Patent No.: US 7,310,165 B2
(45) Date of Patent: Dec. 18, 2007

(54) DYNAMIC COLOR RENDERING DICTIONARIES

(75) Inventor: Michael T. Stevens, Aloha, OR (US)

(73) Assignee: Xerox Corporation, Stamford, CT (US)

(*) Notice: Subject to any disclaimer, the term of this patent is extended or adjusted under 35 U.S.C. 154(b) by 1035 days.

(21) Appl. No.: 10/235,616

(22) Filed: Sep. 5, 2002

(65) Prior Publication Data

US 2004/0046978 A1    Mar. 11, 2004

(51) Int. Cl.
*H04N 1/40* (2006.01)
*G06K 9/00* (2006.01)

(52) U.S. Cl. .................. 358/1.9; 358/2.1; 358/518; 358/523; 382/167; 382/162; 382/165

(58) Field of Classification Search .............. 358/1.9, 358/2.1, 518, 523, 1.17, 517, 527, 3.23, 519, 358/520, 512, 515, 1.1, 1.13, 1.15; 382/163, 382/164, 165, 166, 167; 430/42, 43; 345/601, 345/589
See application file for complete search history.

(56) References Cited

U.S. PATENT DOCUMENTS

| | | | |
|---|---|---|---|
| 4,945,406 A * | 7/1990 | Cok .......................... 358/506 |
| 5,243,414 A | 9/1993 | Dalrymple et al. .......... 358/500 |
| 5,446,833 A * | 8/1995 | Miller et al. ................. 345/585 |
| 5,854,633 A * | 12/1998 | Cooper et al. ............... 345/603 |
| 5,966,462 A | 10/1999 | Linder et al. ................ 382/173 |
| 6,031,628 A | 2/2000 | Jacob et al. .................. 358/1.9 |
| 6,252,677 B1 | 6/2001 | Hawes et al. ................. 358/1.9 |
| 6,304,671 B1 * | 10/2001 | Kakutani ..................... 382/167 |
| 6,327,052 B1 * | 12/2001 | Falk ............................ 358/1.9 |

* cited by examiner

*Primary Examiner*—King Y. Poon
*Assistant Examiner*—S. Kau
(74) *Attorney, Agent, or Firm*—Oliff & Berridge, PLC

(57) ABSTRACT

Dynamic Color Render Dictionaries are provided to automatically switch color rendering behavior between object types. The implementation resides entirely within the Color Render Dictionary (CRD) and require no changes to the state of the Postscript interpreter (There are no required "C" code changes and Postscript operator redefinitions.) The different color rendering behaviors are accomplished by concatenating multiple color transform tables into a single/RenderTable within the CRD. The different rendering behaviors are accessible to single graphics state by simply accessing different regions of the /RenderTable. By having the color rendering behavior "switch" without changing the graphic state makes the implementation very fast. Since the entire implementation is limited to the Color Rendering Dictionary, dynamic CRDs may be implemented on any existing Postscript printer. Even on ones that have been in the field for years.

21 Claims, 8 Drawing Sheets

DYNAMIC COLOR RENDERING DICTIONARIES

CROSS-REFERENCE TO RELATED APPLICATION

The present application is related to the following co-pending application: Ser. No. 10/235,684 "Detecting Graphics Within Color Rendering Dictionaries", filed on the same date as the present application and commonly assigned to the present assignee, the contents of which are herein incorporated by reference.

BACKGROUND

Computer-based imaging systems have become popular for producing both electronic and hard copy images due in part to the proliferation and availability of desktop publishing programs. In such systems, a host computer typically generates data that describes the image and then transfers the data to an image-generating device where it is converted into a format that can be used by the device. Commonly, the image data is in the format of a page description language (PDL), such as, for example, PostScript available from Adobe.

Page description language, i.e., PostScript, compatible desktop publishing and other image producing application programs generate graphic commands which are converted into page description language commands. An imaging device, such as, for example, a printer or display device interprets the page description language commands so that the proper type and sequence of graphics operations can be performed to generate or render the images created in the desktop publishing program. The graphics operations typically include text, graphics, and pictorial (bitmap) operations that are performed on image objects in response to imaging operators imbedded in the page description language. Color Render Dictionaries (CRD) are a mechanism created by Adobe to provide device independent color. Conceptually the application specifies color in a device independent way. The printer then uses its CRD to convert the device independent color to a best matching CMYK value specific to the printer.

The Color Rendering Dictionaries were designed to provide identical color for both graphics and images. In practice, the best color match for graphics is significantly different than the best color match for images. A good graphics color match will produce punchy saturated colors at the cost of matching lightness and/or hue. In contrast, a good image color match will sacrifice saturation in order to better preserve hue and lightness. Traditional approaches to generating color render dictionaries involve finding the best compromise between the color matching styles. The ability to provide a multitude of color behaviors within a single Color Render Dictionary alleviates the need to make this compromise. This results in over-all better color matching.

Beneath the interface, Adobe core code uses a CRD in two distinct ways. Graphic objects require only a single color calculation. For these sorts of objects the number of CPU cycles used to calculate the proper color is relatively small. Rendering bitmapped images may involve calculating millions of distinct colors. The number of CPU cycles used to calculate colors in images can be quite large. For this reason Adobe created two color pipelines. The accurate color pipeline is the most accurate but is relatively slow. The fast color pipeline is faster, but the resulting calculation is not as accurate. Graphic objects use the accurate color pipeline. Images use the fast color pipeline.

A critical part of switching color behaviors based on the object types consists of the task of "detecting" the object type being rendered. This question may easily be phrased as, "Am I rendering an image or a graphic object?" Postscript does not provide an explicit mechanism for making such a query. Therefore a need exists for quickly determining whether an image or graphic is desired while simultaneously rendering the appropriate color.

SUMMARY

Dynamic Color Render Dictionaries are provided to automatically switch color rendering behavior between object types. The implementation resides entirely within the Color Render Dictionary (CRD) and require no changes to the state of the Postscript interpreter (there are no required "C" code changes and Postscript operator redefinitions.) The different color rendering behaviors are accomplished by concatenating multiple color transform tables into a single /RenderTable within the CRD. The different rendering behaviors are accessible to single graphics state by simply accessing different regions of the /RenderTable. By having the color rendering behavior "switch" without changing the graphic state makes the implementation very fast. Since the entire implementation is limited to the Color Rendering Dictionary, dynamic CRDs may be implemented on any existing Postscript printer. Even on ones that have been in the field for years.

Additional objects and advantages of this invention will be apparent from the following detailed description that proceeds with reference to the accompanying drawings.

DETAILED DESCRIPTION

Figure 1:
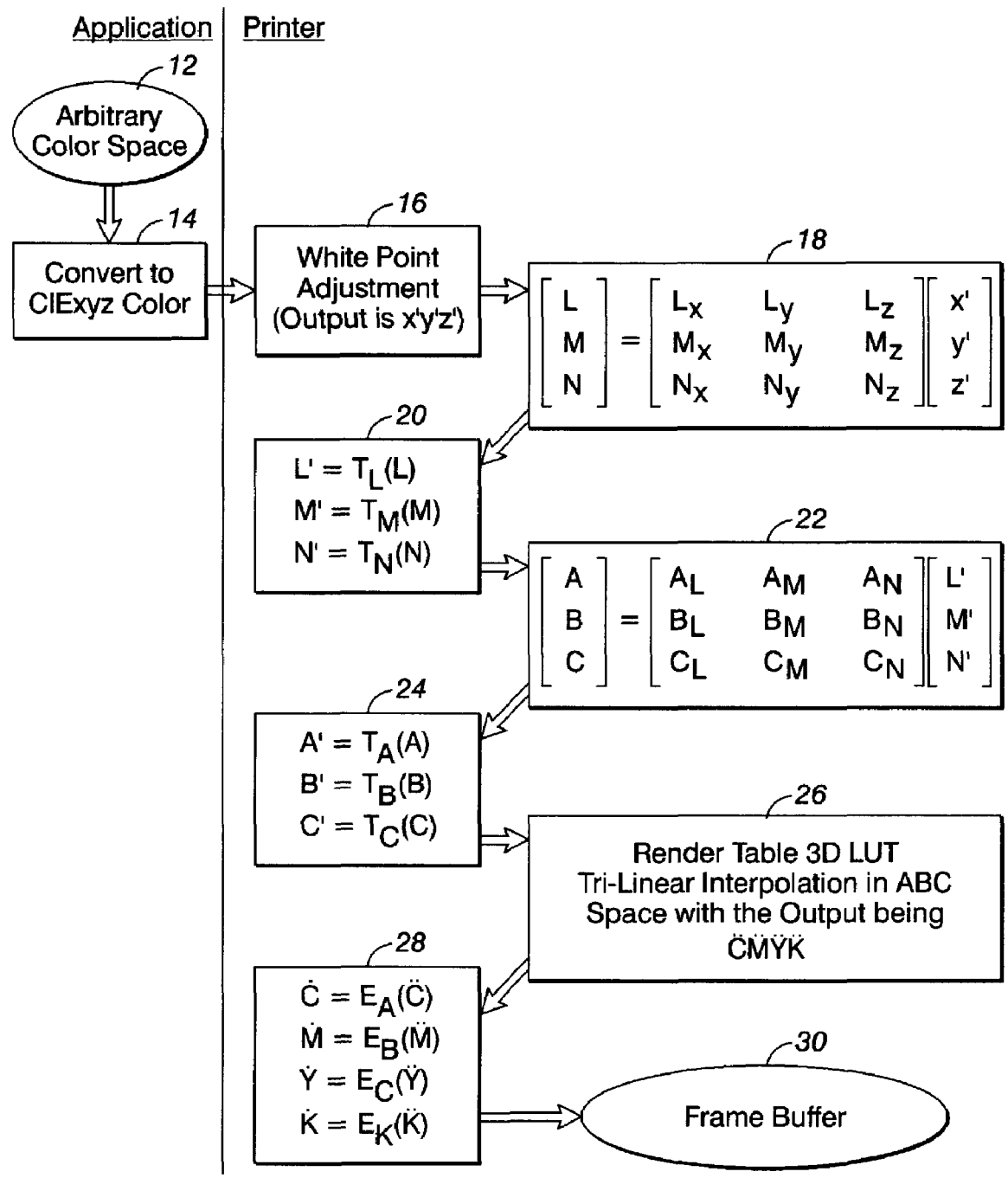
FIG. 1 illustrates a block diagram of a Color Render Dictionary color conversion process as specified by Adobe.
Figure 2:
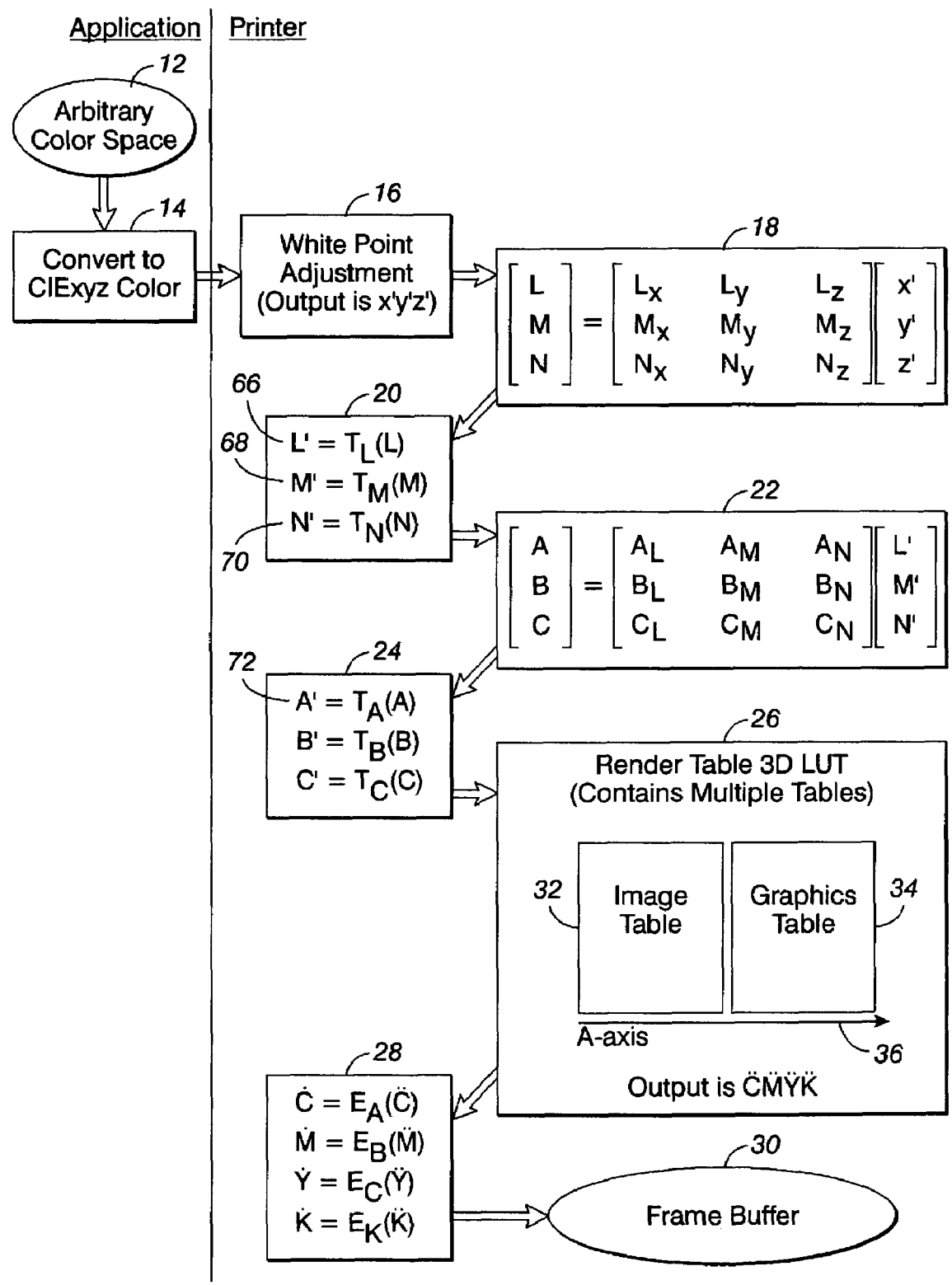
FIG. 2 illustrates a block diagram of a Dynamic Color Render Dictionary color conversion process in accordance with one embodiment of the invention.

Adobe PostScript provides a device independent method of specifying color. An example of PostScript utilizing a Color Render Dictionary color conversion process for specifying device independent color is shown in FIGS. 1 and 2. An application that uses device independent color is more likely to produce consistent looking color on a multitude of printing devices and printing technologies. The application works in a color space of its choosing 12. Generally the working space of an application is a specific calibrated device space. Some of the more powerful applications allow the user to work directly in a device independent space, namely CIEL*a*b*. The application must specify a method of converting its working color space into a CIE tristimulus space (xyz). The application accomplishes this by setting a CIEBased color spaces: CIEBasedA, CIEBasedABC, or CIEBasedDEFG. The output of any of CIEBased color spaces is always CIExyz 14.

On the printer side, it is up to the manufacturer to provide the conversion from CIExyz 14 to printer device signals, generally CMYK. The conversion from CIExyz 14 to printer device signals is accomplished through an Adobe determined sequence of mathematical manipulations. The sequence of mathematical transformations is rigidly defined, and is not configurable. However the specifics of each mathematical transformation is completely configurable. This provides a powerful and robust mechanism for color matching. The CIExyz 14 to device signals mechanism is configured through a color render dictionary.

Turning once again to FIGS. 1 and 2, the color render dictionary must specify a white point adjustment method 16. This adjusts the incoming colors for the differences in between the source color space white point and the device (destination) white point. An example of a white point adjustment 16 that is currently in use is a VonKries transform in a Linearized Bradford space.

After the white point adjustment 16, begins the multi-step process of converting the white point adjusted CIExyz signals into an interpolation space. First the adjusted CIExyz values are matrix multiplied to produce LMN values 18. The specific matrix used is specified as the MatrixLMN entry in the color render dictionary. Next the LMN signals are transformed with encoding functions 20. The encoding process produces three new values: L'M'N' 66, 68, 70, respectively in FIG. 2. The encoding functions take the form of three PostScript procedures $T_L(L)$, $T_M(M)$, and $T_N(N)$. Each of these procedures is expected to consume the input value passed to it as the topmost item on the operand stack and then push the resulting value onto the operand stack. These procedures are specified within the color render dictionary with the EncodeLMN entry.

The next step is to matrix multiply the L'M'N' signals to produce the signals ABC 22. The specific matrix used is determined by the MatrixABC entry in the color render dictionary. Next the ABC signals are transformed with encoding functions 24. The encoding process produces three new values: A'B'C'. The encoding functions take the form of three PostScript procedures $T_A(B)$, $T_B(B)$, and $T_C(C)$. Each of these procedures is expected to consume the input value passed to it as the topmost item on the operand stack and then push the resulting value onto the operand stack. These procedures are specified within the color render dictionary with the EncodeABC entry.

The A'B'C' now represent inputs to a three dimensional look up table 26. The look up table may contain any number of nodes of equally spaced nodes along each axis. Values between nodes are calculated using tri-linear interpolation. The domain of the interpolation is specified in the color render dictionary with the RangeABC entry. The result of the interpolation are intermediate device signals which would be $\check{C}\check{M}\check{Y}\check{K}$. There is one last opportunity to adjust the device signals. These are the post interpolation encoding functions 28. These encoding functions are typically used to apply a tonal response curve to the device signals. The ouput of these encoding functions are $\check{C}\check{M}\check{Y}\check{K}$ signals, which should provide the desired color match to the requested color. At last the device signals are passed to halftoning routines, and eventually make their way into the frame buffer 30.

Adobe core code already makes the determination of each object type and uses the appropriate color pipeline. By determining which color pipeline is being used, it can be safely deduced the object type being rendered. By tracking the order in which the CRD procedures are executed, it is possible to deduce what color pipeline is being used. If the procedures are being executed in the order described in the Adobe Red Book; specifically: EncodeL, EncodeM, EncodeN, EncodeA, EncodeB, EncodeC; followed by the transform procedures in the RenderTable structure; then the object is a graphic. If there are repeated calls of the same procedure, then a cache table is being created, and the object is an image. It should be noted that there is an incredibly large number of variations for this implementation. All of the implementations must contain the following general elements: two or more CRD procedures for storing (write to memory) explicit information about when it was executed; two or more CRD procedures for reading (from memory) the stored information: and two or more CRD procedures for performing computational tasks that allows one or more of the CRD procedures to determine the type of color pipeline being used.

Referring once again to FIG. 2, the Dynamic Color Render Dictionary comprises a render table 26 which is actually a concatenation of two tables, an image table 32 and a graphic table 34. Color table concatenation may be done in the printer or on an external host (not shown). The color table is stored in the 4th element (index 3) of the RenderTable array. The color table itself is an array of strings. Color tables may be concatenated along any axis, namely A, B and C, or even along multiple axis. However, it is easiest to concatenate the tables along the A axis. In order to concatenate two color tables into a single color table along the A-axis, the strings of the color table arrays are concatenated into a single larger array. The following code fragment will perform that task on the printer: "[exch { } forall counttomark 1 add index { } forall ] exch pop". This code fragment consumes the top two objects on the operand stack (which it assumes are color table arrays), then concatenates the contents of each array, and leaves the concatenation as the topmost object on the operand stack. Concatenating color tables along the B axis is accomplished by concatenating the strings themselves. Concatenating color tables along the C axis is accomplished by interleaving fixed intervals of the strings. The concatenated color table will have a total number of nodes equal to the sum of all the nodes in the individual color tables.

In accordance with one embodiment of the invention, a query is made during the $T_A(A)$ 72 encoding procedure. In this procedure a query is made to determine if a graphic object is being imaged, as will be more fully described below. If a graphic object is being imaged a large offset is added to the resulting value along an A-axis (the concatenation axis) 36. This forces the interpolation step to reference the graphics portion 34 of the render table 26. If there is no offset added, the interpolation step will reference the image portion 32 of the table 26. The space between the two tables is never referenced (it would interpolate between the two tables).

Figure 3:
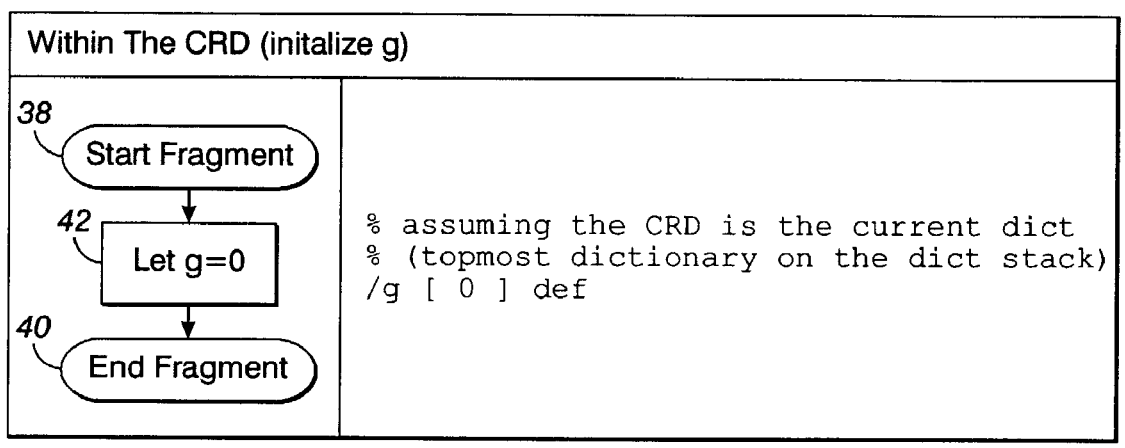
FIG. 3 is a flowchart showing the step of initializing a variable g within a Color Render Dictionary.
Figure 4:
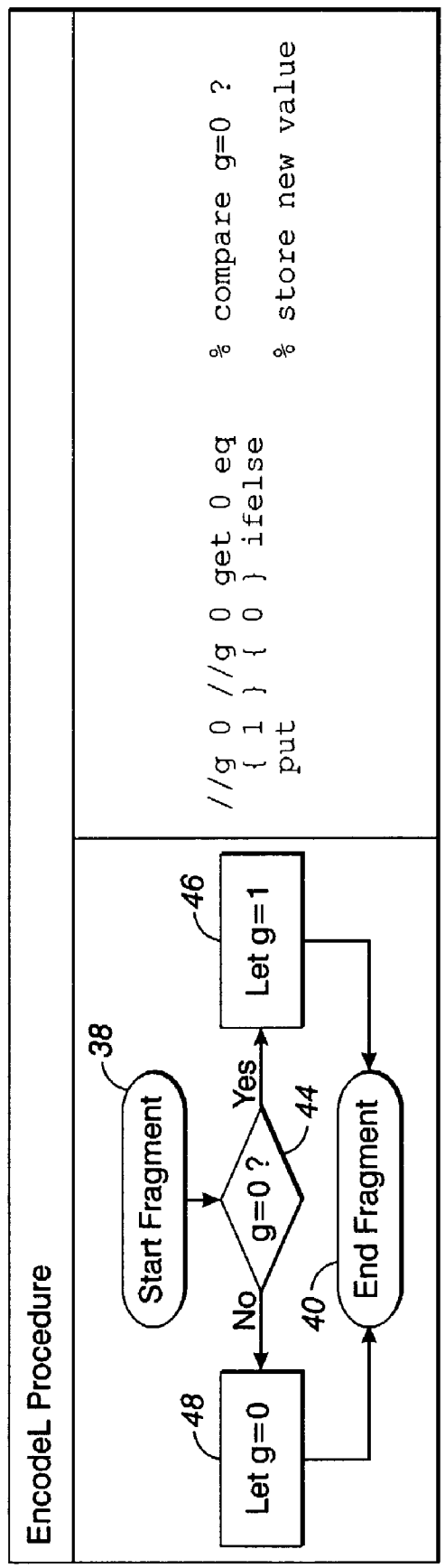
FIG. 4 is a flowchart for detecting an object type during an EncodeL procedure.
Figure 5:
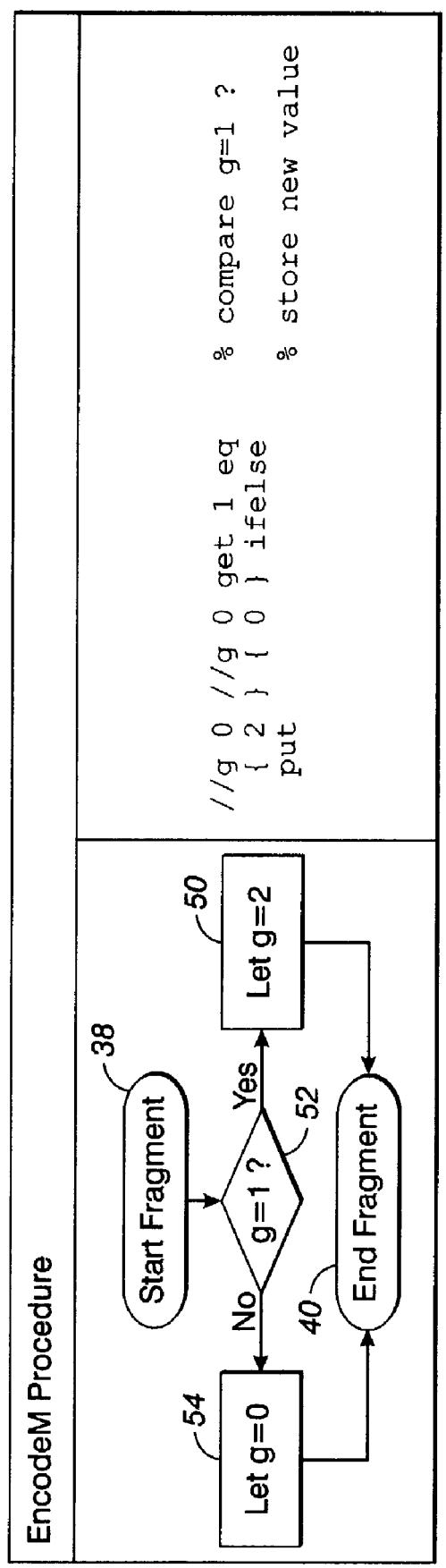
FIG. 5 is a flowchart for detecting an object type during an EncodeM procedure.
Figure 6:
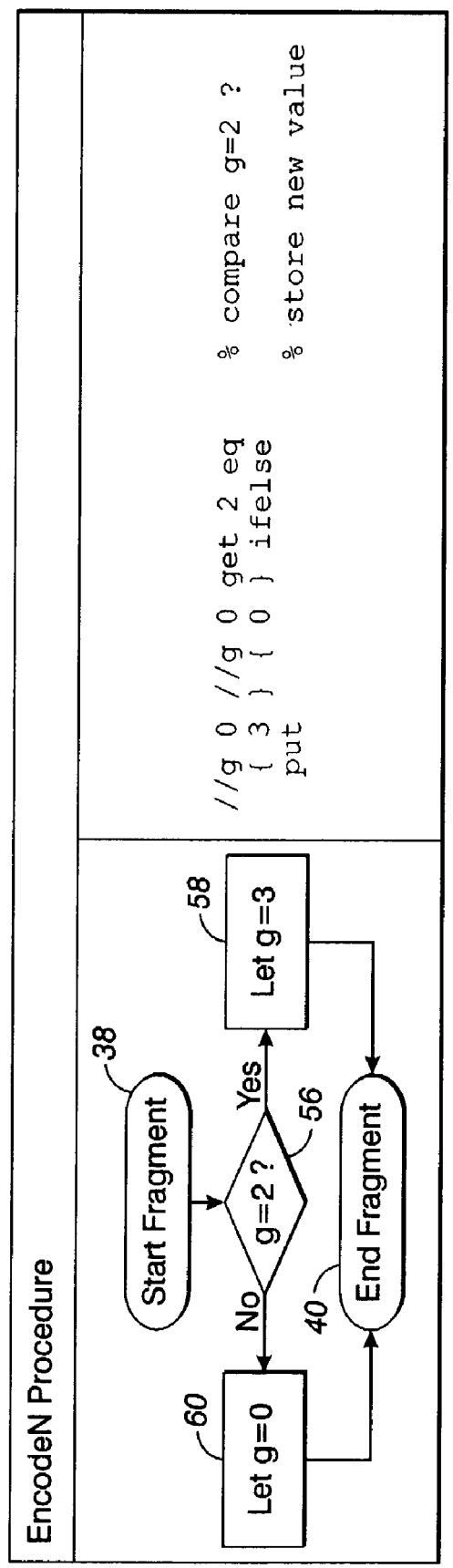
FIG. 6 is a flowchart for detecting an object type during an EncodeN procedure.

The query for the graphic detection mechanism spans several CRD procedures, and the procedures are not executed in a set sequence. This makes it difficult to construct a single flow chart and is therefore shown as a series of flowcharts in FIGS. 3 through 7. The flow charts represent logic fragments out of particular CRD procedures. Postscript does not utilize the concept of static local variables. The entire graphic detection mechanism uses a single variable g wherein g is a static local variable visible only to the procedures within the CRD. In order to simulate the desired variable properties, g is defined to be an array with a single element. The value of g is placed in the array. The procedures are defined with all the references to g preceded by the immediate substitution operator, i.e. //g. This will place the value of g into the procedure at the time of definition (g is an array, and since arrays are composite objects, all instances of the array object will share the same contents.) There are other Postscript composite objects that may be used in a similar manner to achieve equivalent behavior. Turning now to FIG. 3, the variable g has to be initialized by starting a code fragment in step 38 setting g equal to zero in step 42 and ending the code fragment 40 within the CRD. Initializing it in the CRD itself is a nice place to do this. The variable has to be defined and "visible" while the procedures are being defined. As long as the CRD is the topmost dictionary on the dictionary stack, g is visible. The next three logic/code fragments actually do the detecting as shown in FIGS. 4 through 6. They are all parts of the EncodeLMN procedures. If the EncodeLMN procedures are executed in sequence, then g will have a value of 3. For any other sequence, g will have a value that is not equal to 3. If g is equal to 3, then the procedures were executed in sequence. The CRD is being used with the accurate color pipeline. The object being rendered is a graphic. If g is not equal to 3, then the procedures were not executed in sequence. The core code is constructing a fast color cache table. The CRD is being used with the fast color pipeline. The object being rendered is an image. The method used to determine the sequence of the EncodeLMN procedures will be more fully described below with reference to FIGS. 4 through 6 having matching Postscript code with comments mirroring each flow chart.

Referring to FIG. 4, the EncodeL procedure contains a code fragment 38 that will check in step 44 the value of the object detection element g of the array. The code fragment then assigns the element a new value. If the old value was 0, then the new value is 1, as shown in step 46. For all other old values the new assigned value is 0, as shown in step 48. This ends the code fragment step 40 for the EncodeL procedure.

Next, referring to FIG. 5, the EncodeM procedure contains a code fragment 38 that will check in step 52 the value of the object detection element g of the array. The code fragment then assigns the element a new value. If the old value was 1, then the new value is 2, as shown in step 50. For all other old values the new assigned value is 0, as in step 54. This ends the code fragment step 40 for the EncodeM procedure.

Next, referring to FIG. 6, the EncodeN procedure contains a code fragment 38 that will check in step 56 the value of the object detection element g of the array. The code fragment then assigns the element a new value. If the old value was 2, then the new value is 3, as shown in step 58. For all other old values the new assigned value is 0, as in step 60. This ends the code fragment step 40 for the EncodeN procedure.

Figure 7:
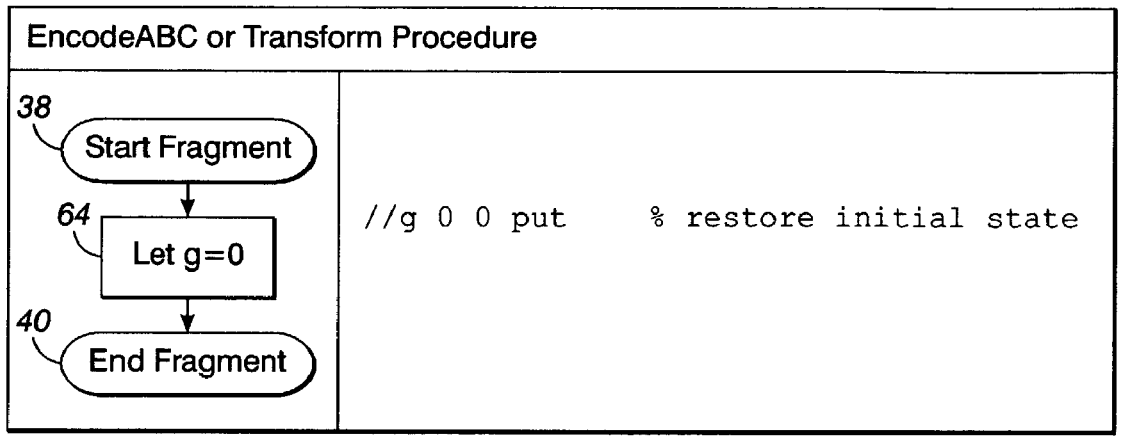
FIG. 7 is a flowchart showing the step of restoring the variable g to the initial state within the Color Render Dictionary.

After all the CRD procedures have been defined, then the reference to g within the CRD may be removed. This will avoid the potential problem of the variable g being referenced by some other Postscript job. The information about the object type may be used in the EncodeABC procedures and/or the transform procedures specified within the RenderTable. It is important that the last reference to g resets the state back to its initial condition. This is done as shown in FIG. 7 wherein a code fragment is step 38 resets g equal to zero in step 64 ending this fragment in step 40. If this is not done, then the graphic detection mechanism may produce incorrect results for subsequent queries. There is a high likelihood that the name g might be used by someone else for some other purpose. Undefining the variable prevents the interpreter from confusing this variable with someone else's.

In summary a mechanism for differentiation between image and graphic objects is entirely contained within the CRD wherein the differentiation between image and graphic objects is accomplished by monitoring the sequence in which the EncodeLMN procedures are executed. When the EncodeL, EncodeM, and EncodeN procedures are executed in that order, a graphic object is being processed/rendered. If the EncodeLMN procedures are executed in any other sequence, an image object is being processed/rendered.

Figure 8:
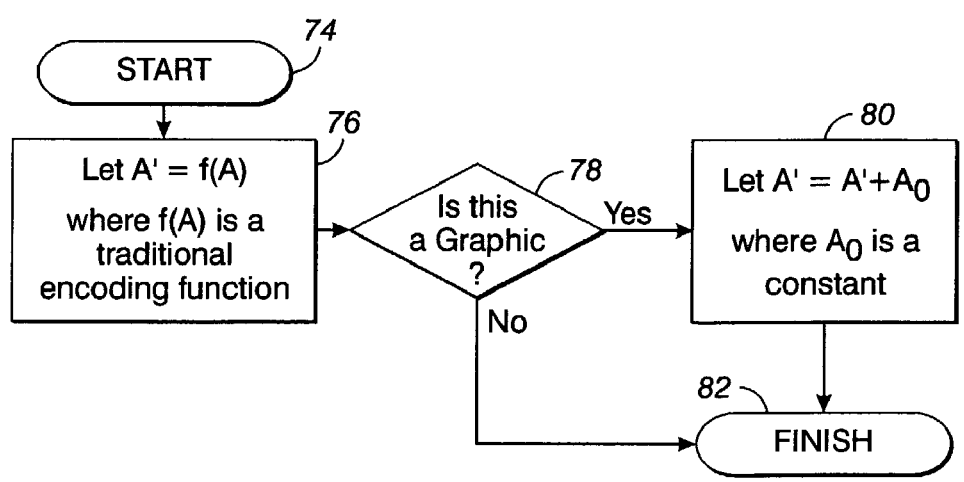
FIG. 8 is a flowchart showing an example of using an encoding function for performing dynamic referencing into a render table.

FIG. 8 is a representation of the table selection mechanism. This flowchart represents the code that makes up the EncodeA procedure 72. When the EncodeA procedure is initiated 74, it is passed an input value of A. The EncodeA procedure then performs an arbitrary encoding 76. The result of this encoding is assigned to the variable A'. This arbitrary encoding includes all the functionality originally defined by Adobe.

All of the remaining processing is strictly related to the table switching mechanism. The next step is to determine if the current object type being rendered is a graphic 78. This is a Boolean test, and may be accomplished by comparing the state variable g to 3. If the state variable g is equal to three, then a graphic object is being rendered, otherwise the object type being rendered must be an image. If the object type being prendered is an image, then no more processing is required, and the EncodeA procedure ends execution 82. If the object type being rendered is a graphic, then the value of A' needs to be translated into the virtual domain of the graphics table 80. This is accomplished by adding the constant A0 to the value of A'. The value of A0 may be calculated using the following equation:

$$A0 = u0 - v0 + (Nu(u1 - u0)/(Nu - 1)),$$

where [u0,u1] is the domain of the image color table along the concatenated axis, and Nu is the number of nodes in the image color table along the concatenated axis; and [v0,v1] is the domain of the graphics color table along the concatenated axis, and Nv is the number of nodes in the graphics color table along the concatenated axis. Once this is done, the EncodeA procedure ends execution 82.

Figure 9:
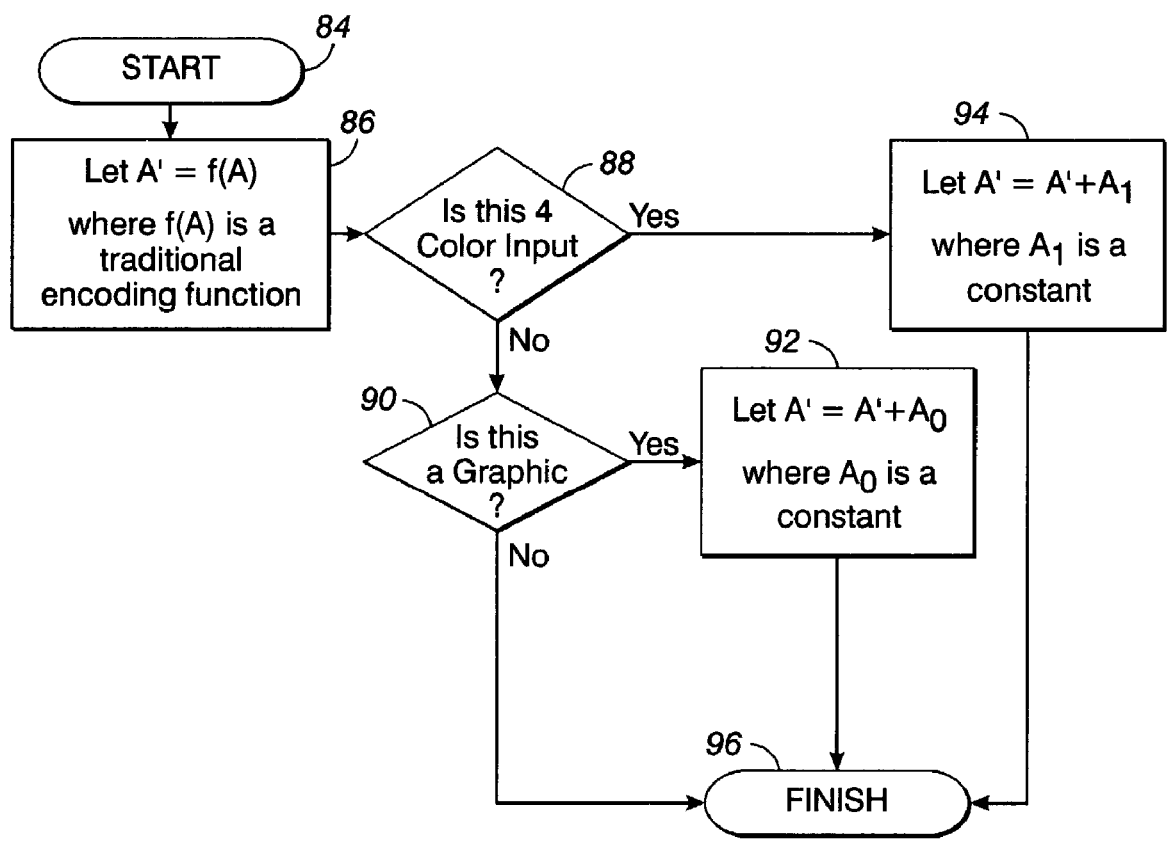
FIG. 9 is a flowchart showing another example of using the encoding function for performing dynamic referencing into the render table.

FIG. 9 represents an alternative implementation of the table switching mechanism. In this implementation it is assumed that there are three color tables concatenate into the RenderTable: an image table, a graphics table, and a colorimetric match table. Execution of the EncodeA procedure begins 84. The procedure is passed an input value of A. The EncodeA procedure then performs an arbitrary encoding 86. The result of this encoding is assigned to the variable A'. This arbitrary encoding includes all the functionality originally defined by Adobe.

All of the remaining processing is strictly related to the table switching mechanism. The first step is to check if the color being processed has been specified as a four color input 88. Four color inputs most likely represent press CMYK values, and might represent pantone spot colors. For these cases it is most desirable to render the object using a colorimetric intent (truly attempt to match the color as closely as possible). Determining the number of color input channels is a trivial task in PostScript. It may easily be accomplished with the following code fragment: mark current color count to mark. If the result of this query is equal to four, then the colorimetric table needs to be selected. The colorimetric table is selected by adding the constant A1 to the value of A' 94. This translates A' into the virtual domain of the colorimetric table. The value of A1 may be calculated using the following equation:

$$A1=(v0-w0)+((Nu+Nv)(v1-v0)/(Nu-1)),$$

where [u0,u1] is the domain of the image color table along the concatenated axis, and Nu is the number of nodes in the image color table along the concatenated axis; and [v0,v1] is the domain of the graphics color table along the concatenated axis, and Nv is the number of nodes in the graphics color table along the concatenated axis; and [w0,w1] is the domain of the graphics color table along the concatenated axis, and Nw is the number of nodes in the graphics color table along the concatenated axis. Once the colorimetric table has been selected, then execution of the EncodeA procedure may end 96.

If at step 88 it is determined that the current color has not been specified as a four color input, then processing continues as follows. The next step is to determine if the current object type being rendered is a graphic 90. This is a Boolean test, and may be accomplished by comparing the state variable g to 3. If the state variable g is equal to three, then a graphic object is being rendered, otherwise the object type being rendered must be an image. If the object type being prendered is an image, then no more processing is required, and the EncodeA procedure ends execution 96. If the object type being rendered is a graphic, then the value of A' needs to be translated into the virtual domain of the graphics table 92. This is accomplished by adding the constant A0 to the value of A'. The value of A0 is may be calculated using the following equation:

$$A0=u0-v0+(Nu(u1-u0)/(Nu-1)),$$

where [u0,u1] is the domain of the image color table along the concatenated axis, and Nu is the number of nodes in the image color table along the concatenated axis; and [v0,v1] is the domain of the graphics color table along the concatenated axis, and Nv is the number of nodes in the graphics color table along the concatenated axis. Once this is done, the EncodeA procedure ends execution 96.

The value of the object type detection element of the array may be used in any of the following CRD procedures: EncodeA, EncodeB, EncodeC, and all of the RenderTable transform procedures. The value of the object detection element of the array is used to intelligently alter/switch the color behavior of the rendering. One of these procedures must also reset the value of the element to its initial value of 0. There are multiple color tables concatenated into a single CRD Render Table entry. Each color table contains data for a distinct color behavior. Individual color tables are accessed by adding constant offsets to the indexing axis of the RenderTable.

A typical CRD color transformation process is static. In other words the resulting color is only a function of the color that the application asked for. This doesn't truly fulfill the needs of an increasingly color savvy printer market. Users expect great color while printing both images and graphics. In practice, the best color match for graphics is significantly different than the best color match for images. A good graphics color match will produce vibrant saturated colors at the cost of matching lightness and/or hue. In contrast a good image color match will sacrifice saturation in order to better preserve hue and lightness. Traditional approaches for generating color render dictionaries involve finding the best compromise between the color matching styles. The ability to provide a multitude of color behaviors within a single Color Render Dictionary alleviates the need to make this compromise. This results in over-all better color matching.

A very non-conventional use of the existing mechanism (and code) causing the CRD to be dynamic is also disclosed. A single PostScript Color Render Dictionary (CRD) automatically produces a multitude of color rendering intents within a single graphic state. This allows the resulting color to depend on more than just the color the application requested. There may be multiple rendering intents that are automatically and intelligently selected. Selection criteria may include and is not limited to: the input color space, the object type being rendered, and/or the actual input color.

It is appreciated that various other alternatives, modifications, variations, improvements, equivalents or substantial equivalents of the teachings herein that for example, are or may be presently unforeseen, unappreciated or subsequently arrived at by applicants or others are also intended to be encompassed by the claims and amendments thereto.

What is claimed is:

1. A method for encoding an imaging device for creating Dynamic Color Rendering Dictionaries, the method comprising:
concatenating two or more color transform tables into a single RenderTable within at least one Color Rendering Dictionary;
determining whether objects to be rendered are graphic type objects or image type objects;
accessing individual color tables for printing or displaying the objects, wherein the individual color tables for the image type objects are accessible by an indexing axis of the single RenderTable, wherein the individual color tables for the graphic type objects are accessible by adding constant offsets to the indexing axis of the single RenderTable, wherein the constant offsets are calculated from a domain and a number of nodes in the individual color tables; and
printing or displaying color images or graphics based on the accessed individual color tables for the graphic type and image type objects.

2. The method for creating Dynamic Rendering Dictionaries according to claim 1, further comprising:
automatically switching color rendering behavior between the graphic and image object types.

3. The method for creating Dynamic Rendering Dictionaries according to claim 1, further comprising:
accessing different rendering behavior within a single graphics state by accessing different regions of said single RenderTable.

4. The method for creating Dynamic Rendering Dictionaries according to claim 1, further comprising:
merging two or more color transform tables into said single merged RenderTable as a Postscript task.

5. The method for creating Dynamic Rendering Dictionaries according to claim 1, further comprising:
concatenating an image table, a graphics table, and a colormetric match table into said single RenderTable.

6. The method for creating Dynamic Rendering Dictionaries according to claim 1, further comprising:
merging two or more color transform tables into said single merged RenderTable by an external host.

7. The method for creating Dynamic Rendering Dictionaries according to claim 1, further comprising:
concatenating along any axis of one or more color tables.

8. The method for creating Dynamic Rendering Dictionaries according to claim 1, further comprising:
concatenating along multiple axes of one or more color tables.

9. The method for creating Dynamic Rendering Dictionaries according to claim 1, further comprising:
concatenating strings of color table arrays into a single larger array.

10. The method for creating Dynamic Rendering Dictionaries according to claim 1, further comprising:
concatenating strings of color table arrays by concatenating said strings themselves.

11. The method for creating Dynamic Rendering Dictionaries according to claim 1, further comprising:
concatenating color table arrays by interleaving fixed intervals of strings.

12. The method for creating Dynamic Color Rendering Dictionaries according to claim 1,
wherein the domain includes a domain in the image color table and a domain in the graphics color table, and the number of nodes includes a number of nodes in the image color table and a number of nodes in the graphics color table.

13. A Dynamic Rendering Dictionary system comprising:
a single RenderTable within a Postscript application comprising more than one concatenated color transform table;
a graphic detection mechanism determines whether objects to be rendered are an image object types or graphic object types;
a table selection mechanism that accesses individual color tables for printing or displaying the objects, wherein the individual color tables for the image type are accessible objects by an indexing axis of the single RenderTable, wherein the individual color tables for the graphic type objects are accessible by adding constant offsets to the indexing axis of said RenderTable, wherein the constant offsets are calculated from a domain and a number of nodes in the individual color tables; and
an imaging device prints or displays images or graphics based on the accessed individual tables for the graphic type and image type objects.

14. The Dynamic Rendering Dictionary system according to claim 13,
wherein the table selection mechanism automatically switches color rendering behavior between the image type and graphic type objects.

15. The Dynamic Rendering Dictionary according to claim 13,
wherein the table selection mechanism accesses different rendering behaviors to single graphics state by accessing different regions of the single RenderTable.

16. The Dynamic Rendering Dictionary system according to claim 13,
wherein the single RenderTable includes two merged color transform tables located on top of an operand stack into a single merged render table.

17. The Dynamic Rendering Dictionary system according to claim 13,
wherein the single RenderTable includes an image table, a graphics table, and a colormetric match table.

18. The Dynamic Rendering Dictionary system according to claim 13,
wherein the single RenderTable includes color tables having an A, B and C axis.

19. The Dynamic Color Rendering Dictionary System according to claim 13,
wherein the domain includes a domain in the image color table and a domain in the graphics color table, and the number of nodes includes a number of nodes in the image color table and a number of nodes in the graphics color table.

20. A method for creating a Dynamic Color Rendering Dictionary for an imaging device, the method comprising:
concatenating two or more color transform tables into a single RenderTable within at least one Color Rendering Dictionary;
determining object types of objects to be rendered, wherein the object types of the objects to be rendered are image object types or graphic object types;
automatically switching color rendering behavior between the image object types and the graphic object types;
accessing individual color tables for printing or displaying the objects, wherein the individual color tables for the image type objects are accessible by an indexing axis of the single RenderTable, wherein the individual color tables for the graphic object types are accessible by adding constant offsets to the indexing axis of said single RenderTable;
accessing different rendering behavior within a single graphics state by accessing different regions of said single RenderTable, wherein the constant offsets are calculated from the domain and the number of nodes in said individual color tables; and
printing or displaying color images or graphics based on the accessed individual color tables for the graphic object types and the image object types.

21. A Dynamic Color Rendering Dictionaries according to claim 20,
wherein the domain includes a domain in the image color table and a domain in the graphics color table, and the number of nodes includes a number of nodes in the image color table and a number of nodes in the graphics color table.

* * * * *